United States Patent [19]

Prohaska

[11] Patent Number: 4,505,552

[45] Date of Patent: Mar. 19, 1985

[54] ADJUSTABLE ELECTRO-OPTICAL DEVICE

[75] Inventor: Peter Prohaska, Nuremberg, Fed. Rep. of Germany

[73] Assignee: International Standard Electric Corporation, New York, N.Y.

[21] Appl. No.: 486,572

[22] Filed: Apr. 19, 1983

[30] Foreign Application Priority Data

Apr. 20, 1982 [DE] Fed. Rep. of Germany ....... 3214583

[51] Int. Cl.³ ................................................ G02F 1/03
[52] U.S. Cl. .................................................... 350/392
[58] Field of Search ................ 350/392, 393, 389, 390

[56] References Cited

U.S. PATENT DOCUMENTS

| 3,746,840 | 7/1973 | Ogland et al. | 235/61.11 |
| 4,410,240 | 10/1983 | Medernach | 350/392 |

FOREIGN PATENT DOCUMENTS

| 2301335 | 1/1973 | Fed. Rep. of Germany. |
| 2322473 | 5/1973 | Fed. Rep. of Germany. |
| 2557254 | 12/1975 | Fed. Rep. of Germany. |
| 2815691 | 4/1978 | Fed. Rep. of Germany. |
| 2919587 | 5/1979 | Fed. Rep. of Germany. |
| 3018452 | 5/1980 | Fed. Rep. of Germany. |

Primary Examiner—Bruce Y. Arnold
Attorney, Agent, or Firm—T. L. Peterson; J. M. May

[57] ABSTRACT

The disclosed invention relates to an electro-optical device for use with a facsimile printer, telecopier, etc., designed to accommodate line-at-a-time output of picture information with the aid of an electrically controllable electro-optical substrate. In particular, there is disclosed a solution to the problem of adjusting the electro-optical elements to provide the desired rectilinear output of picture information. The electro-optically active substrate (1) is supported in a frame-like housing (17) such that it may be adjusted perpendicularly relative to a longitudinal edge (18) of the substrate (1) by means of an adjustable ledge (31) and a resilient support (33). A beam of light from a light source (37) is shaped and directed onto the substrate by means of a light-shape converter (36) which can be adjusted relative to the substrate by means of a cross slide arrangement (51, 57) having 2° freedom. In this way the linear array of active areas (4) of the substrate (1) and the line of light emanating from the light-shape converter (36) can also be adjusted exactly parallel in relation to one another.

10 Claims, 13 Drawing Figures

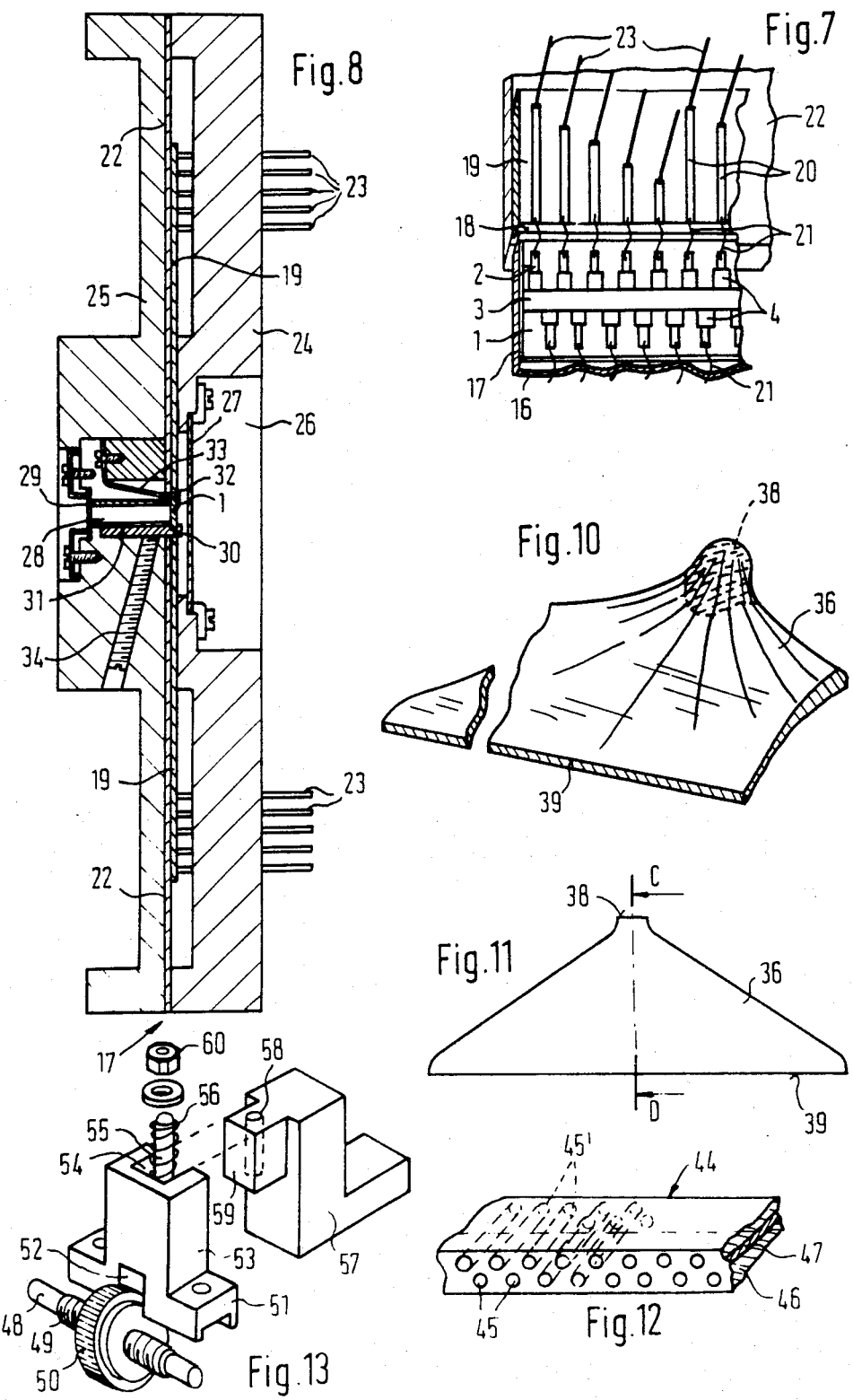

ADJUSTABLE ELECTRO-OPTICAL DEVICE

FIELD OF THE INVENTION

The present invention relates to an electro-optical device incorporating an electrically controllable electro-optical substrate for the line-at-a-time output of video information and, more particularly, to means for adjusting the substrate relative to the other components of the device.

BACKGROUND ART

In an electro-optical device using electrically controllable electro-optical substrates for the linewise output of picture information, the various optical electro-optical components must be precisely adjusted in relation to one another. German published patent application No. DE-OS 25 57 254 discloses an electro-optical device incorporating an electrically controllable electro-optical substrate made from a transparent electro-optical material, with the optical effect being controlled by applying a voltage between control electrodes; one control electrode is common to all picture points and the other is one of a plurality of individual electrodes, each capable of being separately connected to a control voltage. Particularly when a plurality of such substrates are to be joined end to end to provide the capability of simultaneously printing a long line of output, the precise adjustment of each substrate relative to the other components of the device becomes critical. However, the prior art did not provide a simple, accurate and reliable solution to the problem of being able to carry out the required adjustments.

BRIEF SUMMARY OF THE INVENTION

The present invention, therefore, is concerned with the problem of being able to carry out the required adjustments by means of a relatively simple apparatus. According to the invention, the substrate is adjustably supported within a frame-like housing such that it may be adjusted relative to the supporting frame in the direction generally perpendicular to the longitudinal extent of the substrate. An output of light from the substrate can thereby be aligned exactly in accordance with a desired position and orientation. Moreover, in accordance with other aspects of the invention, other optical components of the device may also be adjusted relative to the substrate.

DESCRIPTION OF THE FIGURES

Further advantageous details of the invention will now be described with reference to the exemplary embodiment shown in FIGS. 1 to 13 of the accompanying Drawing, in which:

FIG. 7 shows one possible arrangement of contacts to the substrate in a perspective view;

FIG. 8 shows on an enlarged scale a printing head incorporating the invention;

FIG. 10 shows the light-shape converter in a perspective representation;

FIG. 11 shows the light-shape converter of FIGS. 9 and 10 in a top view with the line C-D showing the orientation of the section shown in FIG. 9;

FIG. 12 shows a portion of the focusing unit of FIG. 9 in perspective; and

FIG. 13 shows a cross slide for the light-shape converter.

DESCRIPTION OF A PREFERRED EMBODIMENT

Figure 1:
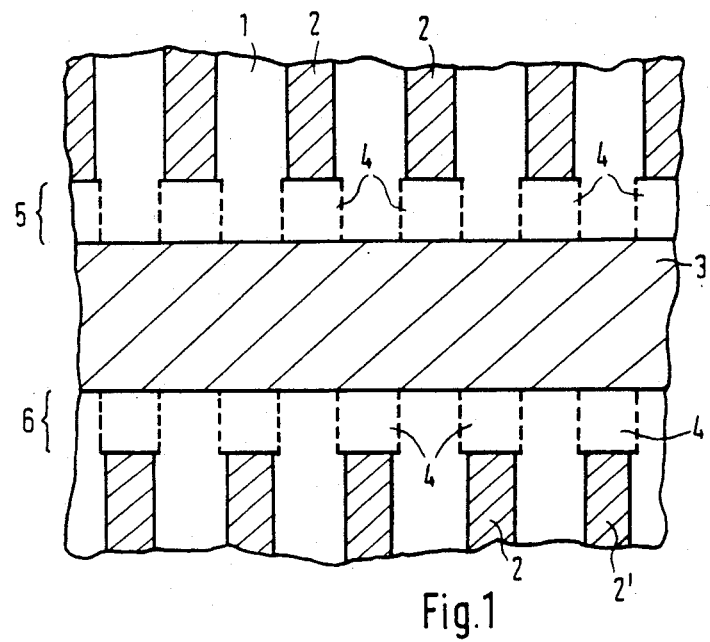
FIG. 1 shows part of a substrate employing electrodes according to the invention, as seen from above.

In FIG. 1, the reference numeral 1 indicates a substrate of electro-optical material whose optical properties can be changed within a predetermined active area 4 by applying a voltage between two respective control electrodes 2 and 3 arranged at a defined spaced-apart relation with respect to each other. A well-known suitable material is transparent ceramic lead lanthanum zirconate titanate (PLZT) which, as is well-known, has double-refracting properties.

In the illustrated exemplary embodiment, there are provided a plurality of such active areas 4 arranged in two broken lines 5 and 6 which together, when projected onto the same line, will result in a single continuous line. The organization of the active areas into two broken lines 5, 6 permits the very fine subdivision of a line into very narrow points of light (each corresponding to an individual area 4), which nevertheless can be individually connected to an external control voltage without the widths of the control electrodes 2 having to be made very small. This arrangement provides a high degree of reliability against voltage flashovers from one control electrode 2 to a neighboring one, as well as a high current-carrying capacity. The second control electrode 3 is a strip-shaped central electrode which is common to all areas 4.

Figure 2:
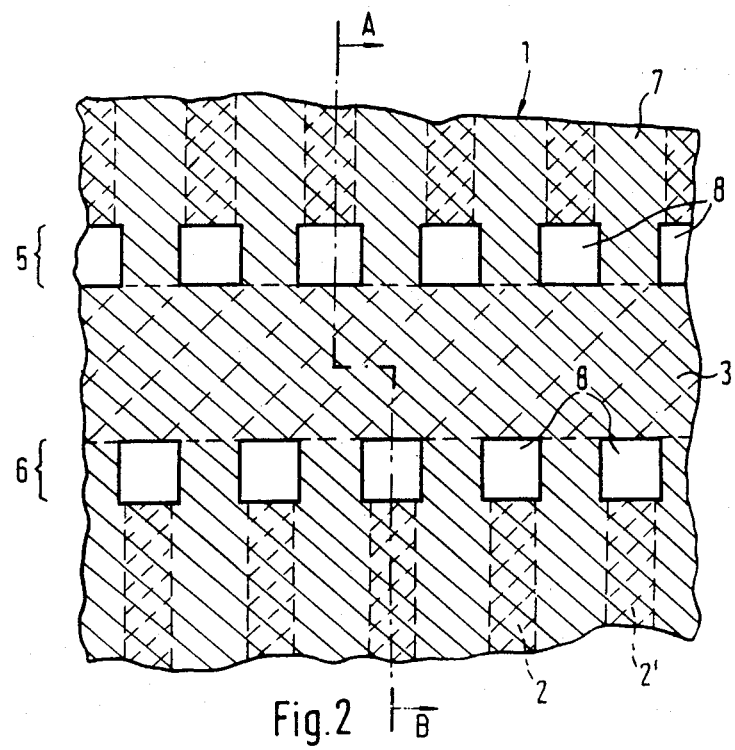
FIG. 2 shows the same as seen from below.
Figure 3:
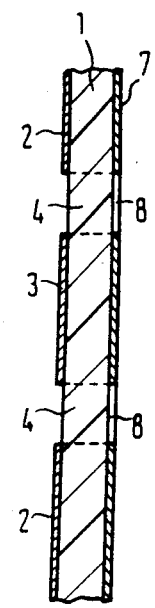
FIG. 3 is a sectional view taken on line A-B of FIG. 2.

According to the present invention, an additional electrode 7 is provided for on the side of the substrate 1 opposite the control electrodes 2, 3, with this additional electrode 7, in the embodiment illustrated in FIGS. 2 and 3, being a surface electrode common to all such areas 4 on a given substrate, with window-shaped openings 8 being provided therein, the shape and locations of the openings 8 corresponding to the areas 4 on the other side of the substrate 1.

The operation of the electro-optical device will now be explained with reference to FIGS. 4 through 6.

Figure 4:
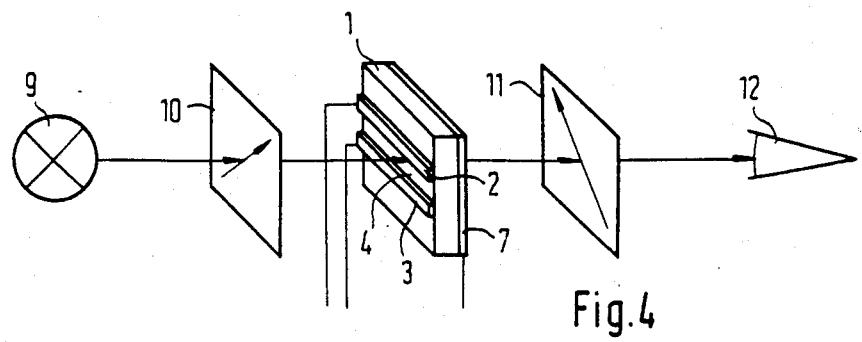
FIG. 4 is a schematical representation of such a substrate in use.

As shown schematically in FIG. 4, there is arranged a light source 9 followed by a first polarization filter 10, which in turn is followed by the electro-optical device consisting of the substrate 1, the control electrodes 2, 3 and the additional electrode 7. (The openings 8 are not visible in this Figure.) Next there is arranged a second polarization filter 11 which, with respect to the first one, is rotated by 90° so that no light is permitted to pass under normal exposure conditions. Following the polarization filter 11, there is provided a radiation sensitive (in particular, a photosensitive) element 12. In the case of an electrostatic printer, this latter may be a carrier bearing a layer of selenium, cadmium or silicon which, if so required, may also be correspondingly doped.

If now the required control voltage, for example, a dc voltage of 200 V, is applied to the control electrodes 2, 3, the transmitted polarized light has its plane of polarization rotated so that it may pass through the second polarization filter 11, thereby exposing a corresponding point of the light-sensitive element 12.

Figure 5:
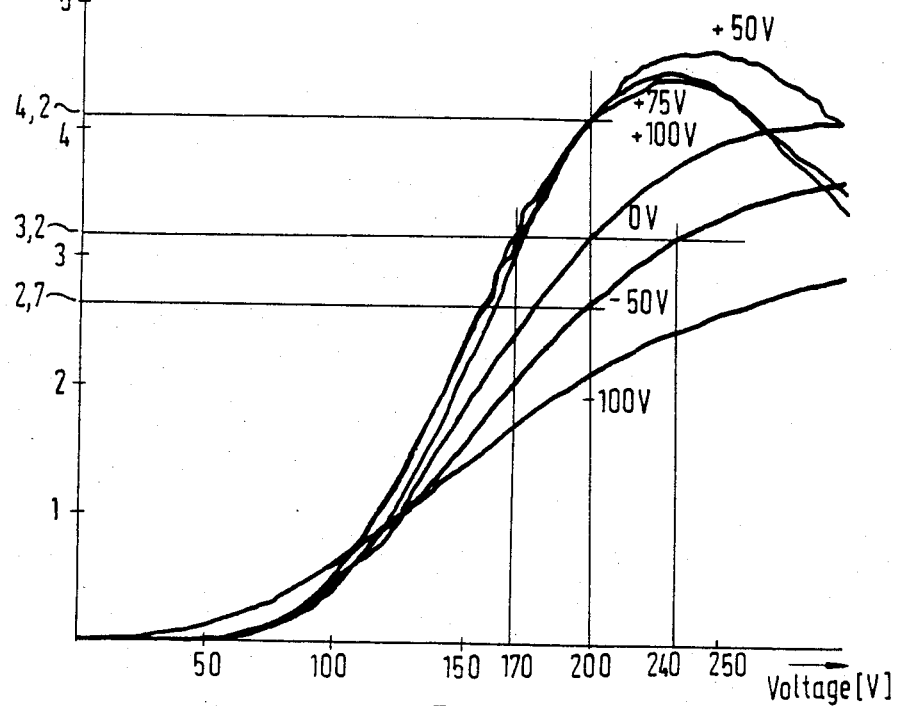
FIG. 5 is a graph showing the dependence of light intensity upon control voltage for different potentials at the additional electrode.

The transmittance at a defined light intensity is indicated in the diagram as shown in FIG. 5 with respect to a voltage of zero V at the additional electrode 7. If now a bias voltage is applied to the additional electrode 7, the transmittance changes in accordance with the curves as shown. As can be seen, the light intensity at the receiver, that is, at the light-sensitive element 12, can thereby be varied within a relatively wide range, without the control voltage at the control electrodes 2, 3 having to be changed. Therefore, for the same output intensity, it is possible, for example, to lower the control voltage from 200 to 170 V if a dc voltage of $+50$ to $+100$ V is applied to the additional electrode 7. This means that the necessary control currents can be substantially reduced, and that also the danger of flashovers between two neighboring control electrodes 2, 2', (FIGS. 1 to 3) can be reduced; alternatively, these control electrodes, 2, 2' can be arranged closer to each other, thus resulting in a still finer subdivision of the individual picture elements or areas 4.

The application of a negative voltage to the additional electrode 7 reduces the intensity. Accordingly, it will be seen that an electro-optical device according to the invention can to a large extent be adapted to different existing requirements.

Figure 6:
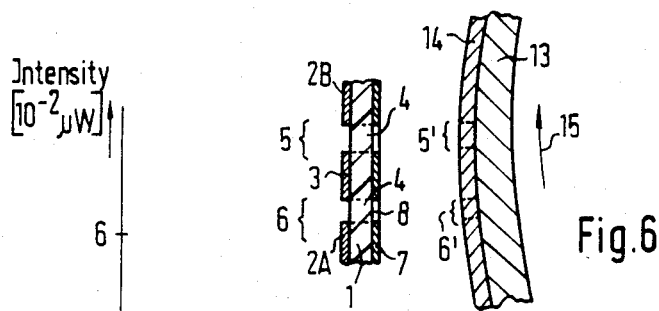
FIG. 6 is a side view showing part of a drum coated with a photoconductive layer.

With reference to FIG. 6, the mode of operation of the staggered areas 4 organized into two broken lines 5, 6 together corresponding to a single output line of light will now be described briefly. As the light-sensitive element 12, there is illustrated a section of a carrier drum 13 which is coated with a radiation-sensitive layer 14. The drum 13 is assumed to rotate in the direction as indicated by the arrow 15. In order to print a whole line, at first the individual areas 4 of the lower broken line 6 are activated by a short-lasting application of a control voltage to the lower control electrodes 2A and to the common control electrode 3, so that on the carrier drum 13, the layer 14 along one partial line 6' is exposed and, for example, discharged. Upon rotation of the carrier drum 13 in the direction as indicated by the arrow 15, the upper broken line 5 is activated when the previously exposed partial line 6' is positioned in front of the areas 4 of the upper broken line 5 by applying the control voltage at the proper time to the upper control electrodes 2B and the center electrode 3. As a result, a second partial line 5' is recorded in overlapping relationship to the partial line 6'. The two partial lines 5', 6' therefore are printed as one continuous line. Owing to the fact that no electrical connections are required to pass through the areas 4, the partial lines 5', 6' can be successively printed to obtain a single line having a very good resolution.

Preferably, the control electrodes 2 are oriented at right angles relative to the center electrode 3.

As is shown in FIG. 7, the substrate 1 is appropriately mounted on a transparent carrier 16 which is adjustably inserted in a suitable frame 17 (FIGS. 7 and 8). Along the longitudinal edges 18 of the carrier 16, there is provided on either side a circuit board 19 with printed conductors 20 facing the respective longitudinal edge 18. Each printed conductor 20 is connected to the opposite control electrode 2 by means of a thin electrical lead 21, such as gold wire bonded at either end. The circuit board 19, in turn, may be mounted to a carrier 22 likewise arranged in the frame 17. Alternatively, both the carrier 16 and the carrier 22 may be in the form of one common carrier.

Preferably, the printed conductors 20 have various lengths with a predetermined number, for example five, of successively printed conductors 20 being successively shortened stepwise from a basic length. At the ends of the conductors 20 there preferably are provided respective terminal contacts 23, such as soldering terminals or plug-in contacts, which preferably project upwards from the circuit board 19.

FIG. 8 is a cross sectional view showing the arrangement of the FIG. 7 device within a frame 17. The frame 17, which in one practical embodiment, may have a width of about 15 centimeters and a length of about 40 centimeters, consists of two frame-like plate members 24 and 25 to form a frame, of which the member 24 (shown on the right) has a relatively large central opening 26 provided with a polarization filter 27 and, the member 25 (shown on the left) has a smaller, gaplike opening 28 provided with a second polarization filter 29 rotated by 90° relative to the first one. The plate members 24, 25 are secured to one another by appropriate means such as screws.

Within the frame, the position of the substrate 1 is adjustable in the direction of the substrate plane. To that end, one longitudinal edge of the substrate 1 (or of the optional substrate carrier 16) is inserted in a longitudinal groove 30 of an adjusting ledge 31 oriented along the length of the frame 17. The opposite longitudinal edge 18 is held, for example, in a claw 32 of a leaf-type compression spring 33. Adjustment is effected with the aid of a plurality of adjusting screws 34 provided along a longitudinal edge of the substrate 1 and bearing on the adjusting ledge 31, at least two of which are preferably arranged in the vicinity of the ends of the substrate 1. With such an adjustable mounting arrangement for the substrate 1, no carrier 16 is required.

Since it is not practical to manufacture a substrate 1 having an arbitrarily long length and since for printing a line of a DIN A 4 page, the (output) line of light should have a length of at least 18 to 20 centimeters, several such substrates 1 are arranged next to each other, with two compression springs 33 and two adjusting screws 34 as well as one adjusting ledge 31 being provided for each individual substrate 1.

These adjusting ledges 31 are preferably made from an elastic material such as a suitable plastic and, preferably, several adjusting ledges 31 are integrally formed as one common ledge indented in the region of the butt joint between two adjacent substrates 1, so that there will result several easily movable partial ledges flexibly joined to one another, with the length of each such partial ledge 31 approximately corresponding to that of a single substrate 1.

Figure 9:
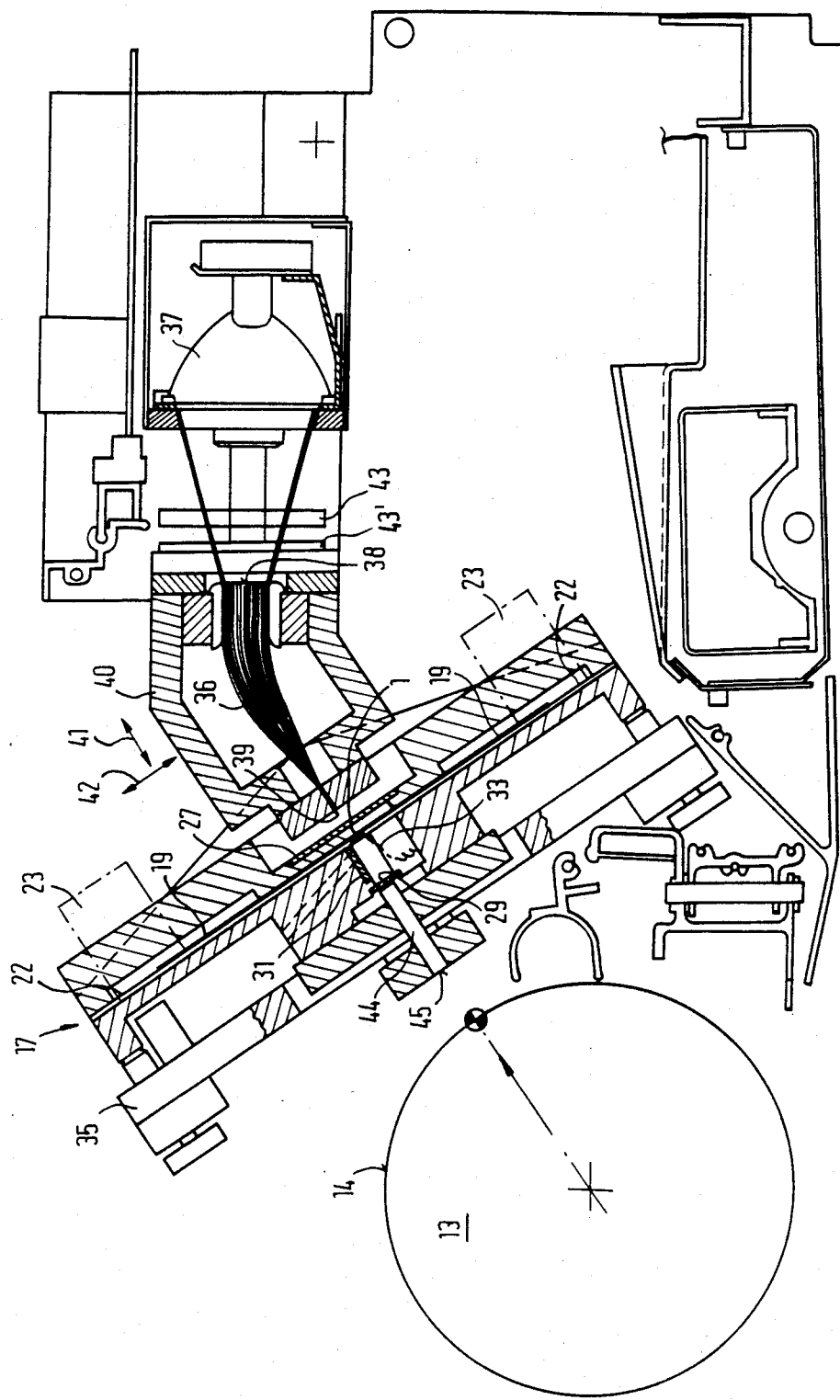
FIG. 9 shows the printing head of FIG. 8 installed in a printer employing a light-shape converter.

A printer constructed according to the invention and employing the above-described electro-optical device is shown in FIG. 9. The frame 17 is arranged in this case on a support 35. Above the first polarization filter 27, there is provided a light-shape converter 36 for converting the shape of the circular bundle of light rays coming from a light source 37 and impinging upon the circular input surface 38 of the light-shape converter 36 into a line of light 39. This light-shape converter is shown in greater detail in FIGS. 10 and 11, which show graphically how the circular input face 38 is transformed into a line of light 39. The light-shape converter may consist of an injection-molded part of transparent plastic; however, it preferably contains a suitably shaped bundle of glass fibers, which will have low transmission losses and which may be exposed to higher temperatures than an injection-molded plastic part.

The light-shape converter 36 is accommodated inside a housing 40. This housing is capable of being adjustably aligned with the aid of suitable mechanical components, both in the direction of the polarization filter 27 and the substrate 1 and transversely (arrows 41, 42, FIG. 9). By this means it can be aligned exactly parallel in relation to the substrate 1 and the substrate's broken lines 5, 6. By axial displacement in the direction as indicated by the arrow 41, the transmitted light intensity can also be varied. A suitable adjustable positioning arrangement will be described hereinafter with reference to FIG. 13.

As can be seen from FIG. 9, at least one heat-absorbing filter 43 is arranged between the light source and the input face 38. In addition thereto, filters 43' may be provided, which only permit the desired wavelength to pass (or a desired range of wavelengths) to which, for example, the light-sensitive layer 14 of the carrier drum 13 reacts particularly favorably.

Below the second polarization filter 29 there is arranged a fiber optics collimating unit 44 arranged at a small spacing from the output face 45. This unit serves to rectify the light rays that are controllably transmitted through a particular area 4 to form a parallel, highly collimated pencil of rays which impinge upon the layer 14 of the carrier drum 13 to form a sharply focused point of light.

FIG. 12 shows the fiber optics collimating unit 44 schematically in a perspective representation. It consists substantially of a supporting framework 46 with optical fiber rods 47 arranged therein to extend parallel in relation to one another. The rods 47 are staggered with respect to one another in such a way that the input faces 45' and the output faces 45 are arranged in the same pattern as the areas 4 of the substrate 1. The optical fiber rods 47 preferably are formed from so-called gradient fibers which, as the result of doping or a suitable heat treatment in a special atmosphere, have a refractive index continuously decreasing from the inside towards the outside. Of course, it is also possible to use optical fiber rods having a stepwise changing index of refraction.

A cross slide suitable for adjusting the light-shape converter 36 is shown in FIG. 13. The light-shape converter 36 is secured in position with the aid of two such cross slides arranged either side of the longitudinal (output) end of the housing 40. Each such cross slide consists of a shaft 48 provided with a fine-pitch thread 49 on which a knurled wheel is adjustable. The shaft 48 is rigidly connected, for example, to the frame 17. Over the shaft 48 there is provided a guide block 51, the lower part of which is provided with a slot 52 whose width corresponds to the thickness of the knurled wheel 50. In the vertical pillar 53 of the guide block 51, there is provided a guide groove 54 containing a threaded bolt 55 over which a helical compression spring 56 is slipped. An adjusting block 57 is adapted to be installed thereon, with a corresponding opening 58 being provided in the guide portion 59. The adjusting block 57 is capable of being fixed in position by means of an adjusting nut 60. The housing 40 of the light-shape converter 36 is mounted to the adjusting block 57. By turning the knurled wheel 50, each end of the housing 40 can be transversely adjusted in the direction as indicated by the arrow 42, and, by turning the adjusting nut 60, in the axial direction as indicated by the arrow 41. With the aid of the two cross slides provided for at the longitudinal ends of the housing 40 (FIG. 9), it is thus possible to achieve an exact parallel alignment of the line of light 39 (FIG. 10) in relation to the partial lines 5, 6 of the substrate 1.

What is claimed is:

1. Electro-optical apparatus for outputting a line of picture information, said apparatus comprising;
    a plurality of electrically controllable electro-optical transparent substrates, each said substrate having a first and second longitudinally extending edge;
    a frame for supporting said plurality of substrates in a linear array;
    adjusting means for individually adjusting each of said substrates relative to said frame in a direction perpendicular to a respective said first longitudinal edge; and
    holding means associated with each said second longitudinal edge for resiliently holding the second edges relative to said frame and for urging said respective substrates towards said adjusting means.

2. Apparatus as recited in claim 1, wherein said adjusting means comprises a unitary strip defining a plurality of partial ledges arranged in a linear array, with each of said partial ledges being associated with a respective said first longitudinal edge of a respective said substrate, said strip within the area of a butt joint between two adjacent said substrates being provided with an indentation to permit adjacent ones of said partial ledges to be adjusted relative to each other, and wherein each said adjusting means further comprises a pair of set screws associated with each said partial ledge for moving said each partial ledge relative to said frame.

3. The electro-optical apparatus of claim 1 further comprising:
    a light source;
    means for converting a circular input of light from said light source into a rectilinear array of light; and
    adjustable mounting means for adjustably positioning said converting means relative to said frame.

4. Apparatus as recited in claim 3, wherein said mounting means is adjustable in a direction generally perpendicular to said linear array of substrates.

5. Apparatus as recited in claim 3, wherein said mounting means comprises a carrier and a pair of cross slides attached to opposing ends of said carrier for adjustably mounting said carrier to said frame.

6. Apparatus as recited in claim 5, wherein at least one of said cross slides comprises: a stationary threaded shaft; a knurled wheel; a guiding block having a surface in contact with a face of said knurled wheel and movable therewith in the axial direction of said shaft; an adjusting block slidably displaceable with respect to said guiding block; a threaded bolt and nut arrangement for providing an adjustable stop for said adjusting block relative to said guiding block; and a spring for urging said adjusting block against said adjustable stop.

7. An electro-optical device comprising:
    an electrically controllable electro-optical transparent substrate, said substrate having first and second longitudinally extending edges;
    a frame for supporting said substrate;

holding means, located in the vicinity of and associated with said first longitudinal edge, for resiliently holding said substrate relative to said frame; and adjusting means, in physical contact with said second longitudinal edge, for adjusting the position of said substrate relative to said frame in a direction generally perpendicular to said first and second longitudinal edges.

8. A device as recited in claim 7, wherein said adjusting means comprises a movable adjusting element defining a groove for holding said second edge.

9. A device as recited in claim 8, wherein said holding means comprises a spring having a resilient arm portion for accommodating relative movement between said substrate and said frame in said perpendicular direction and a claw portion at one end of said arm portion for retaining said first longitudinal edge of said substrate.

10. A device as recited in claim 7, wherein said adjusting means comprises an adjusting element defining a ledge for supporting said second longitudinal edge of said substrate.

* * * * *